(12) United States Patent
Amacker et al.

(10) Patent No.: US 9,304,646 B2
(45) Date of Patent: Apr. 5, 2016

(54) MULTI-USER CONTENT INTERACTIONS

(75) Inventors: Matthew W. Amacker, Santa Clara, CA (US); Joel D. Tesler, Cupertino, CA (US)

(73) Assignee: A9.com, Inc., Palo Alto, CA (US)

( * ) Notice: Subject to any disclaimer, the term of this patent is extended or adjusted under 35 U.S.C. 154(b) by 224 days.

(21) Appl. No.: 13/425,289

(22) Filed: Mar. 20, 2012

(65) Prior Publication Data

US 2013/0254648 A1    Sep. 26, 2013

(51) Int. Cl.
| | |
|---|---|
| *G06F 17/00* | (2006.01) |
| *G06F 3/0481* | (2013.01) |
| *G06F 3/01* | (2006.01) |
| *G06F 17/11* | (2006.01) |

(52) U.S. Cl.
CPC .............. *G06F 3/0481* (2013.01); *G06F 3/017* (2013.01)

(58) Field of Classification Search
CPC ....................................................... G06F 3/048
USPC ......................................................... 715/234
See application file for complete search history.

(56) References Cited

U.S. PATENT DOCUMENTS

| | | | |
|---|---|---|---|
| 5,485,565 A | | 1/1996 | Saund et al. |
| 5,850,222 A | | 12/1998 | Cone |
| 7,184,047 B1 | | 2/2007 | Crampton |
| 2006/0271448 A1 | | 11/2006 | Inoue et al. |
| 2009/0089186 A1 | * | 4/2009 | Paolini ............................ 705/27 |
| 2009/0103780 A1 | | 4/2009 | Nishihara et al. |
| 2010/0030578 A1 | | 2/2010 | Siddique et al. |
| 2010/0111370 A1 | | 5/2010 | Black et al. |
| 2010/0125816 A1 | | 5/2010 | Bezos |
| 2010/0306082 A1 | | 12/2010 | Wolper et al. |
| 2011/0062229 A1 | | 3/2011 | Rhoads |
| 2011/0246329 A1 | * | 10/2011 | Geisner et al. ............... 705/27.1 |
| 2011/0271210 A1 | | 11/2011 | Jones et al. |
| 2011/0298897 A1 | | 12/2011 | Sareen et al. |
| 2012/0047425 A1 | | 2/2012 | Ahmed |
| 2012/0062729 A1 | | 3/2012 | Hart et al. |
| 2012/0166974 A1 | * | 6/2012 | Elford et al. ................... 715/760 |
| 2012/0197754 A1 | | 8/2012 | Kalin |
| 2012/0257035 A1 | * | 10/2012 | Larsen ........................... 348/78 |
| 2013/0097194 A1 | * | 4/2013 | Braga et al. .................... 707/758 |
| 2013/0120238 A1 | * | 5/2013 | Spaulding et al. ............. 345/156 |
| 2013/0174055 A1 | * | 7/2013 | Johnson et al. ............... 715/753 |
| 2013/0204707 A1 | * | 8/2013 | Ptucha et al. .............. 705/14.66 |

(Continued)

OTHER PUBLICATIONS

Gerling et al., "Full-Body Motion-Based Game Interaction for Older Adults", ACM, 2012, pp. 1873-1882.*

(Continued)

*Primary Examiner* — James J Debrow

(57) ABSTRACT

Information from a position and/or gesture detection system can be embedded in a Web page, or other such presentation of content, and used to select or otherwise interact with content on the page. In some embodiments, video is captured and displayed showing a current view of the user. Position data corresponding to the video is provided and used to determine directions and extents of motion without having to do significant amounts of image processing. The position data is used to determine locations on the page where the user is attempting to provide input, such as to select an item of content. The content can be modified and/or rendered to appear to be associated with the user in the rendered view. Information from multiple gesture systems can be combined on a single page, and information from one or more gesture systems can be shared among multiple pages and devices.

24 Claims, 8 Drawing Sheets

(56) References Cited

U.S. PATENT DOCUMENTS

2013/0218721 A1* 8/2013 Borhan et al. ............. 705/26.41
2014/0035913 A1* 2/2014 Higgins et al. ................ 345/420

OTHER PUBLICATIONS

Nassiri, Nasser, Software Agent in Desktop Virtual Shopping, IEEE, 2009, pp. 618-620.*
Budde et al., SEICOS: Semantically Enriched Interactive Collaborative Online Shopping, ACM, 2009, pp. 604-608.*
"Non-Final Office Action dated Mar. 7, 2014," U.S. Appl. No. 13/425,261, 19 pages.
"Notice of Allowance dated Sep. 15, 2014," U.S. Appl. No. 13/425,261, 20 pages.
"International Search Report and Written Opinion dated Mar. 27, 2014," International Application No. PCT/US2013/033192, 10 pages.
"Non-Final Office Action dated Oct. 10, 2013," U.S. Appl. No. 13/425,280, 16 pages.
"Final Office Action dated May 2, 2014," U.S. Appl. No. 13/425,280, 18 pages.
"Non-Final Office Action dated Oct. 28, 2013," U.S. Appl. No. 13/425,289, 15 pages.
"Final Office Action dated May 2, 2014," U.S. Appl. No. 13/425,289, 19 pages.
"Non-Final Office Action dated Jan. 28, 2015," U.S. Appl. No. 13/425,261.
Non-Final Office Action dated Nov. 21, 2014, U.S. Appl. No. 13/425,280.

* cited by examiner

MULTI-USER CONTENT INTERACTIONS

BACKGROUND

People are increasingly utilizing computing and electronic devices to perform various types of tasks. In order to enable users to efficiently perform these tasks, various methods of interacting with the devices are being provided. For example, certain devices enable a user to speak commands or use basic gestures to provide input to a device. Components such as a camera and infrared sensors can detect the movement of a user for purposes of providing input to these devices. Unfortunately, conventional approaches only work within a specific environment. For example, the Kinect® peripheral device from Microsoft Corporation enables recognition of users and tracking of user movement. The Kinect data is typically only available within a Kinect application environment, however, and thus has limited use with other applications. Similarly, basic gesture recognition such as "wave to wake" or "touching" a certain area of a screen have limited applicability to the various tasks mentioned above.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more of the aforementioned and other deficiencies experienced in conventional approaches to enabling a user to interact with an electronic device. In particular, various approaches discussed herein enable a user to provide input using a motion, position, and/or gesture recognition system operable to capture image and/or position data of a user and provide that data to a Web page, application, or other such destination for processing or other utilization. In at least some embodiments, a gesture widget can be embedded in a Web page that enables a view of the user to be displayed, where the view comprises image and/or video information captured by a gesture system. Position data from the gesture system can be used to determine a direction and/or location at which a user is performing a gesture. The direction and/or location can correspond to regions outside the gesture widget, such as to images or content at any location in the Web page. Such a process enables a user to select or interact with any appropriate object on the page. In at least some embodiments, selected images or objects can be modified and rendered to appear to be displayed on the user in the user view. A user also can use motion or gesture input to purchase items, cause item information to be presented to other users or sent to other device, and perform other such actions.

Various other applications, processes, and uses are presented below with respect to the various embodiments.

Figure 1:
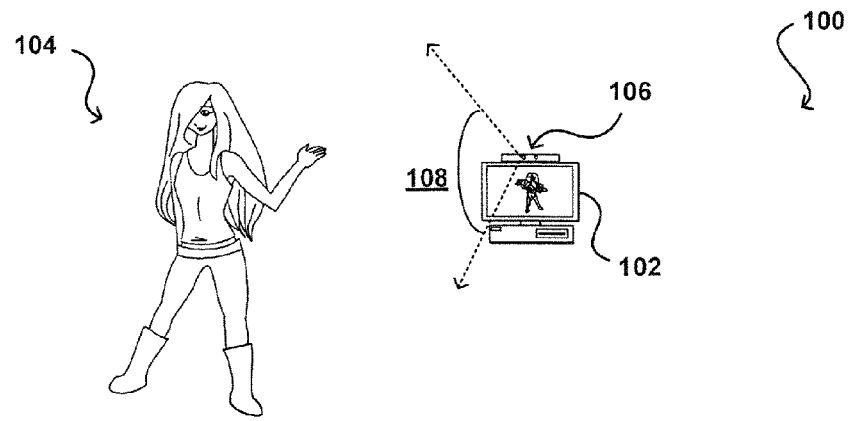
FIG. 1 illustrates an example of a user interacting with a computing device in accordance with at least one embodiment.

FIG. 1 illustrates an example situation 100 wherein a user 104 is interacting with a computing device 102. Although a desktop computing device is shown in this example, it should be understood that various other types of electronic device that are capable of determining and processing input can be used in accordance with various embodiments discussed herein. These devices can include, for example, smart phones, e-book readers, tablet computers, notebook computers, personal data assistants, video gaming consoles or controllers, smart televisions, and portable media players, among others. Further, the components illustrated can be part of a single device, while at least some components illustrated and otherwise utilized for such a device can be provided as one or more peripheral devices or accessories within the scope of the various embodiments.

In the example of FIG. 1, the computing device 102 has one or more imaging elements 106 positioned so as to be able to capture images (or video) of at least a portion of a user positioned in a conventional location with respect to the device. In this example where the computing device has a primary display screen, the imaging elements can be positioned so as to capture images of a user positioned substantially in front of the display screen, where the user would typically be positioned to interact with the device. The imaging elements can include at least one camera or sensor with a lens having an angular field of view 108 such that image information can be captured of a user as long as at least a portion of that user 104 is at least partially within that field of view 108. In order to detect certain motions, positions, or gestures, however, at least a minimum portion of one or more specific features of the user must be represented in the captured image information in order to enable the device (or software executing on or in communication with the device) to make the determination.

In at least one embodiment, software executing on the computing device attempts to locate the relative position, orientation, and movement of a user with respect to the device. Such a determination can be performed using various types of technology. For example, two-dimensional image information can be captured to determine certain direction and motion information. Devices such as the Kinect utilize structured lighting with two-dimensional image capture to obtain three-dimensional information by projecting a regular pattern of light (e.g., infrared (IR) light) and analyzing the changes in the reflected pattern due to three dimensional objects. Other approaches such as those used for motion capture use a similar approach by monitoring the change in location of specific features during user movement. In some embodiments, two-dimensional image capture can be enhanced using a distance sensor, range finders, ultrasonic transceiver, or other such device capable of providing distance information. In some embodiments, three-dimensional or stereoscopic image information can be captured to provide three-dimensional point data, or disparity information, that can be used to determine motion in three dimensions. Various other approaches can be utilized as well as should be apparent to one of ordinary skill in the art in light of the teachings and suggestions contained herein.

Figure 2:
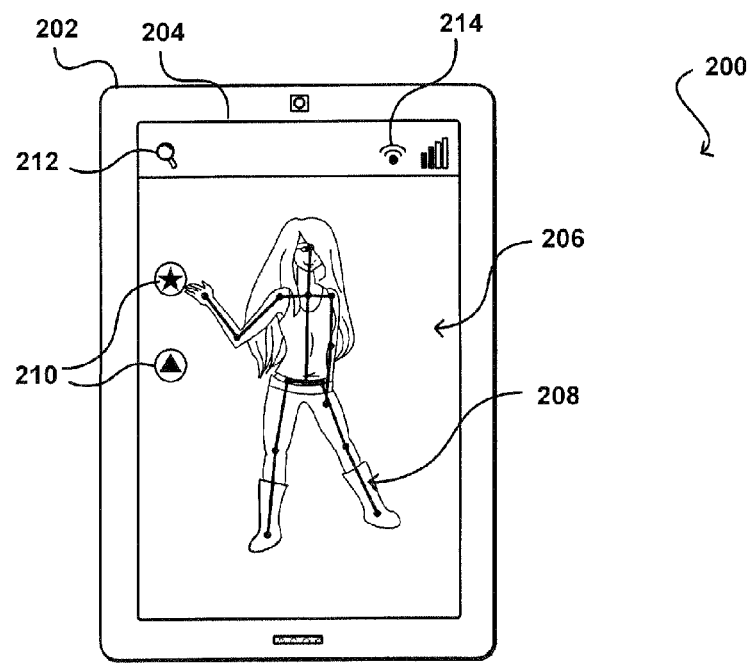
FIG. 2 illustrates an example display of user data captured and utilized by a device such as that illustrated in FIG. 1 that can be provided in accordance with various embodiments.

Image and/or other such information captured by one or more capture elements of a computing device can be used to determine various types of information. In the example state 200 of FIG. 2, for example, the captured data is analyzed to provide at least two types of information. First, at least one camera is used to capture a view of the user 206 of the device 202. The view of the user can be used for a variety of purposes, such as to perform facial recognition or user identification, as well as to determine the outline of the user's body in its current configuration relative to the computing device. Using the structured lighting reflections or other such information, three-dimensional point data can also be determined and analyzed to generate a model 208 of the body of the user that represents the current orientation of the user in three dimensions. Relying solely on two-dimensional information can make it difficult to determine when one of the user's arms is held towards the front or back of the user, for example. Further, analyzing full resolution image data can be very computationally intensive, which can provide a significant lag in motion detection. By using point data from structured lighting and determining a basic model 208 of the user's body, which can relatively accurately reflect motions of the user, gestures and motions can be determined in near real time that enable a user to provide input to the computing device.

A potential downside to conventional approaches is that the motion and gesture information is only able to be used within an environment of the imaging system. For example, in FIG. 2 a view of the user is shown, as captured by at least one camera of the imaging system, along with body position data 208, which may or may not be shown in various embodiments but is presented for purposes of explanation. In this example, the user is able to select options 210 or provide other inputs within an environment of the gesture system. For example, the user 206 is shown to be reaching out to "touch" the star input, which is positioned within the gesture environment. This example could correspond to an application running on a mobile device, as illustrated, where there could be other options illustrated on a display screen 204, such as the ability to perform a search using a search option 212 or turn off Wi-Fi using a selectable Wi-Fi graphical element 214. Using conventional approaches, however, the application is unable to reach "outside" its environment to enable the user to select those options 212, 214 or otherwise provide input to other applications executing on the device.

Approaches in accordance with various embodiments enable data from a motion, gesture, and/or imaging system, or other such system or process, to be utilized outside its native environment to be used with other applications, such as with Web pages rendered in a Web browser. For example, the data of the user model 208 generated and illustrated in FIG. 2 can be provided to a data analysis module or other such process that is capable of analyzing the shape and/or dimensions of the model in its current state to determine information such as where the user's arm is pointing, how far the user's arm is extending, where the user is looking, and/or other such information. Such a module can also be configured to determine the relative position of various elements rendered on the device display, such that the module can determine the likely element with which the user is attempting to interact or provide input. For example, in FIG. 2 the system can tell that in the current orientation the user is attempting to select one of the native environment options 210. If the user was to raise her right arm such that the visual representation was pointing towards the upper corner of the display, however, the module could determine that the user is instead attempting to select the search option 212, even though the search option is outside the native environment of the gesture system.

In order to provide such functionality, the gesture system (or other such system, service, process, or module) in various embodiments can be added to a page or interface layout through a widget, frame, window, or other portion of the rendered content. Another application or process executing on (or in communication with) the device can have access to data produced by the gesture system and can also have information about the elements, widgets, and other such content rendered on the display. The application can use gesture data provided by the gesture system, or can accept point or other such data that the application can analyze to determine various gestures. Such an approach enables applications to determine specific actions for specific gestures without having to have access to, or specific knowledge of, the gesture system. An input management application, for example, can enable the user input to act like a cursor or position-dependent touch input, for example, whereby the user can interact with various portions or elements of the display. While certain embodiments can place limits on the locations or types of functionality that can be provided through the gesture system, other embodiments can enable as much access to functionality of the device as is practical and/or possible using the gesture system.

In one example, data from a gesture system can be added to a Web page using JavaScript® or other active scripting languages capable in executing in a client browser. As mentioned, the gesture system can be connected directly to (or part of) a user computing device, or can be available over at least one network connection. In at least one embodiment, a dedicated gesture server can be configured to listen for requests (e.g., HTTP requests) from a client device or browser application, for example, as well as to listen for data from a designated gesture system. The gesture server can, upon receiving a request from a browser for gesture data, generate an unending response where units of data are encapsulated in script tags with the response stream, effectively generating a data pipe that is able to send data substantially continually from the gesture system to the web page. In at least some embodiments, such a stream can include separately executable script chunks that can be executed as soon as they are received. Other methods for establishing communications channels can be used as well within the scope of the various embodiments. In some embodiments, cross-domain communication can be enabled through use of embedded iframes or other such constructs that can enable the gesture system data (in a first domain) to be utilized on other areas of a Web page (in a second domain), as well as to allow information from the Web page domains to be provided to the gesture system, among other such functions. It at least one embodiment, the gesture data can be serialized into a notation such as JSON (JavaScript Object Notation) by the gesture server and piped into the browser through one or more JavaScript function calls, or other active script functions executing in the client browser. The gesture server can utilize at least one JavaScript API or other such interface to transfer the data. The function calls can handle the passing of the gesture data into the Web page (or otherwise out onto a network) where the gesture data is to be rendered using standard JavaScript (or other such) rendering techniques. The gesture data thus can be published not only to a local Web page but to any appropriate location available across an appropriate network, which can include other computing devices of the same or other users as discussed elsewhere herein. Similarly, data from multiple gesture systems can be included in a single Web page viewed on a single device, even though the systems might be in different locations and belong to different users, etc.

Figure 3A:
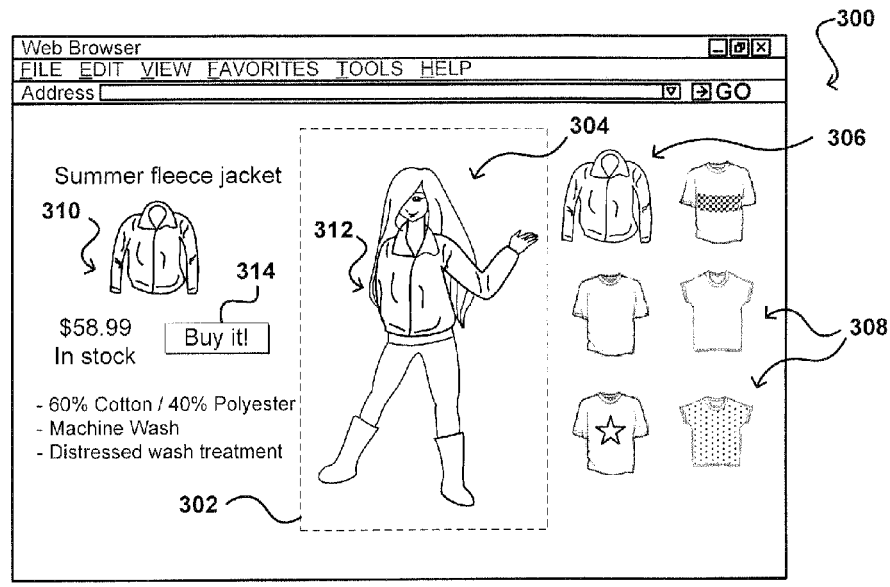
FIGS. 3(a) and 3(b) illustrate example interfaces with which a user can interact in accordance with various embodiments.

FIG. 3(a) illustrates an example state 300 of a Web page or application that can take advantage of such functionality within the scope of the various embodiments. Although a Web page showing content from an electronic marketplace is described for purposes of explanation, it should be understood that any appropriate interface rendering any appropriate type of content can take advantage of motion-, position-, or gesture-based input in accordance with the various embodiments. In this example, a page of content corresponding to clothing items offered through an electronic marketplace is displayed. The page can be a Web page rendered in HTML or another such markup language, for example, and can include one or more widgets or modules, such as a widget 302 corresponding to a gesture recognition system as discussed herein. Various other portions of the page can be provided using modules, widgets, frames, or other such sources in accordance with the various embodiments.

In the example of FIG. 3(a), the gesture widget 302 is placed on a Web page that displays a set of items 308 offered for consumption (i.e., buy, rent, purchase, lease, or download) through an electronic marketplace. Although clothing items are shown, it should be understood that various types of item can take advantage of approaches discussed herein, and that various other types of content can be selected or utilized as well in other examples. The selection of items to be displayed can be performed using any appropriate technique, such as by performing a keyword search, navigating to a particular category of items, accessing user-specific recommendations, and the like. The items 308 in the interface are images of actual products in this example, arranged in an array to the right of the interface, although various other representations and arrangements can be used as well as should be apparent in light of the present disclosure. The user can view the display while being positioned within a field of view of the gesture recognition system, such that a view of the user (or another such graphical avatar, icon, cursor, or representation) is illustrated corresponding to a current position and/or orientation of the user. When the user is facing the system, the representation shown will typically be a "mirror" image of the user, such that the user can move his or her right hand to select items on the right side of the interface, even though the image 304 or representation will appear to be using a left hand to be performing the selection.

The user in this example is able to use one or more of the user's arms to point to one or more of the items 308 displayed on the page. Contrary to the situation illustrated in FIG. 2, in this example the user is able to select items that are outside the gesture widget 302 or gesture environment. In FIG. 3(a), the user is pointing her arm towards a specific object 306. Information from the gesture system can be analyzed by an application or script executing in the client browser or on a Web server, for example, to identify the item to which the user is pointing. As discussed elsewhere herein, such a process can utilize information such as the angle of the user's arm(s), the angle of the forearm to the user's body, a distance the user is holding out the arm, and/or other such information to not only determine a direction the user is pointing, but how far along that direction the user is attempting to provide input. For example, there could be multiple items along a given direction, and the item the user intends to select can be determined by how far in that direction the user is extending his or her arm.

In FIG. 3(a) the user is determined to be pointing to a specific item 306. Upon the user selecting that item, the script executing in the client browser can request information corresponding to that item, such as by sending a request to a Web server for content corresponding to an item identifier associated with the image of the item that is displayed. In this example, information 310 for the selected item 306 can be displayed on the page to enable the user to obtain additional information about that item. There can be various types of content and information provided, although in the example display the information includes at least one image of the item, pricing and description of the item, and an option to purchase the item. Such an approach enables the user to control, adjust, or update the information displayed on a Web page using a gesture recognition system that is provided from a source (or domain) other than the provider of the Web page. In some systems the script on the page can automatically determine that the computing device contains a gesture system and can automatically enable the gesture widget 302 to be displayed on the page. In other embodiments, a user might have to associate the gesture system with the page or a user profile, among other such options. In some embodiments, the gesture system might be part of a separate computing device or system than is being used to view the page, as discussed elsewhere herein.

In at least some embodiments, the user can also utilize one of the user's hands to point towards a buy button 314 or other such option to enable the user to purchase the item without having to enter any information or perform any action other than selecting the item using the gesture system and selecting an option to purchase the selected item (assuming the user has set up a profile, provided payment information, and/or otherwise enabled such a purchasing approach).

As discussed, the gesture widget 302 does not have to show a view of the user, but might show a representation of the detected gesture or might not show anything at all, with the gesture system instead being used to control a cursor or other selection element displayed on the page. Displaying a view 304 of the user in this example, however, enables selected items to be displayed with that view of the user. As discussed, the user in this example used the gesture system to select a particular clothing item 306. Since the view of the user is displayed on the same page, software executing on the client device and/or a remote server can cause a view 312 of the selected item to be displayed on, over, or with respect to the view 304 of the user. As illustrated, such an approach can enable a user to place one or more clothing items over the view of the user, in order to provide the user with an idea of what the clothing item might look like on the user. The user can combine items to put together looks or outfits, and can see how those items go with the user's skin tone, hair color, and other such information.

In addition to color information, however, approaches discussed herein can also modify or render image information for various clothing items such that the view of the user can appear to "wear" those items, where the rendering of the items substantially corresponds to the shape of the user as represented in the view 304 in the gesture widget 302. For example, the arm of the selected jacket can be rendered to substantially match the position of the user's arm in the view, where the arm is extended to select the item. A main portion of the clothing item image can be stretched, compressed, or otherwise rendered to substantially correspond to the user's torso, in order to provide a view of what the item would actually look like if worn by the user. As discussed later herein, if the dimensions of the user are available and dimensions of the clothing item are available, such an approach also can help the user to determine the appropriate size of the item for the user, and the item can be rendered with the approximate dimensions so the user can also see how that particular size will look on the user (i.e., whether it will be too small, too long, etc.). Further, because the view of the user can be presented in near-real time using video capture, for example, the user can view different poses and perform different actions in the clothing, such as to see how the length of a pair of pants would work with bent knees as opposed to standing upright, how the back would look, etc. In some embodiments, the user can perform a gesture to capture video over a period of time for playback, such that the user can view how the outfit looked from the back or side, which might be difficult to otherwise see when the user is facing the computer and/or gesture system.

Figure 3B:
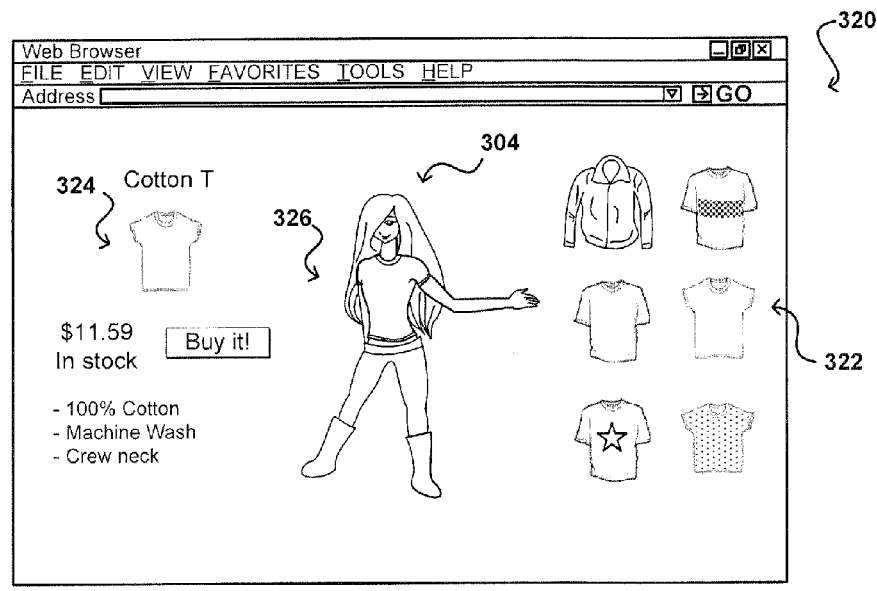

Such an approach can enable a user to virtually try on different clothing items and combinations of clothing items. For example, in the example state 320 of FIG. 3(*b*) the user has adjusted a position and/or orientation of the user's arm to select a different clothing item 322. As can be seen, the user not only changed the direction of the user's arm in order to select the appropriate item, but also extended her arm to indicate that she wanted to select the item in the far column. Upon selecting the item, which might require pointing at a specific item for at least a minimum selection period of time in at least some embodiments, the information 324 for the newly selected item can be displayed and a view 326 of the newly selected item displayed over the view 304 of the user. If the user had previously selected the pants or boots that are displayed with the view 304, for example, the user can view different tops with the pants and boots to see which combination she prefers. Further, although only shirts are shown in this example, the user can also select belts, hats, jewelry, watches, purses, tattoo designs, and other such items as well within the scope of the various embodiments.

In order to provide the selection and rendering capability, the script or application rendering the Web content (or other appropriate content) in at least some embodiments needs to be able to access and analyze the data from the gesture system. In a Web environment where the gesture data is provided as a feed of JSON data as discussed earlier, for example, script executing on the client device (or on a Web server operable to receive the feed) can analyze the skeleton data provided by the gesture system to determine relative positions of the wrist and elbow points, for example. In the example gesture system data 400 illustrated in FIG. 4(*a*), the script might determine the relative positions of a shoulder point 406, elbow point 410, and hand point 408 to determine a relative direction in which the user is pointing. In some embodiments the forearm direction as defined by the elbow and hand points can be used to determine the direction, while more complex systems might attempt to use the shoulder point as well as a head point or other such information to attempt to determine where the user is actually intending to point (as the elbow point will generally not correspond to the point of view of the user). The script also can use information such as the angle of the user's upper arm, as defined by the shoulder and elbow points, to determine the amount of extension of the user's arm, although distance of the hand from the torso or other such information can be used as well. Such information can be used to determine how far out the user is attempting to select, such as where the items are arranged in columns and the user uses extension to designate the column from which to select. In at least some embodiments the arms can behave like laser pointers that create beams that point to certain locations (but may or may not actually be shown on the display). When one of those beams intersects an item or element on the page, an appropriate action can be taken. In some embodiments, a virtual ray tracing is performed using the user's forearm, and the intersection of a ray with an item can be determined using various approaches that can be similar in at least some aspects to touch input, cursor input, and the like.

The skeleton data also can be used to determine how to render one or more image items with respect to a view of the user. As discussed, two-dimensional image data can be computationally expensive to analyze, particularly to determine three-dimensional information. In order to determine the relative positions of a user's appendages for purposes of rendering clothing or other items thereon, the skeleton can provide a faster and potentially more accurate description of those relative positions. For example, the legs of a pair of pants can be rendered to remain substantially centered around the skeletal representation of the user's legs. The points at which the arms and legs bend also can quickly be determined from the skeletal information, which can be useful when attempting to determine how to render an image of an item for a current orientation of the user.

Figure 4A:
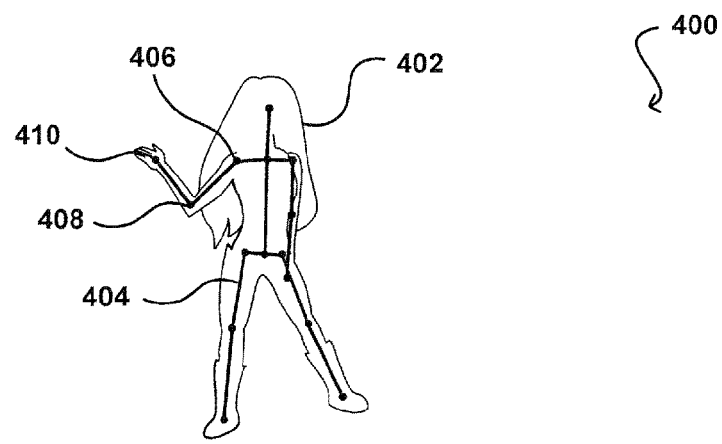
FIGS. 4(a), 4(b), and 4(c) illustrate example approaches to mapping image content to a user representation that can be utilized in accordance with various embodiments.
Figure 4B:
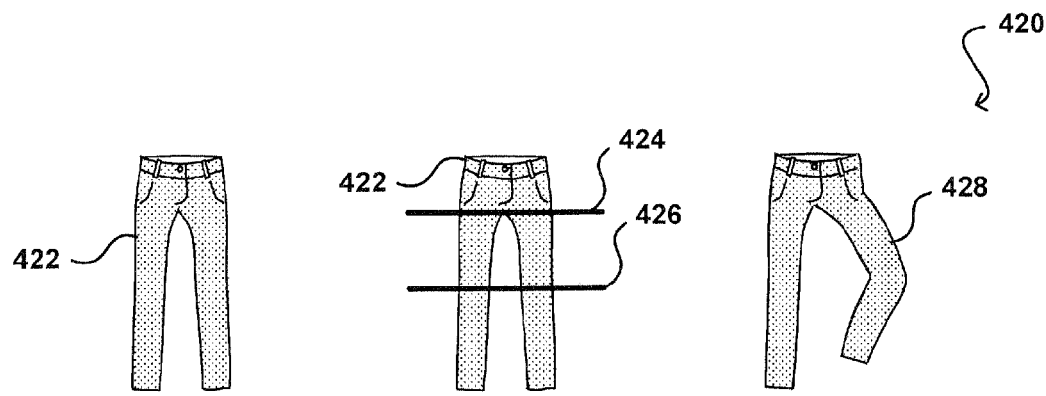
Figure 4C:
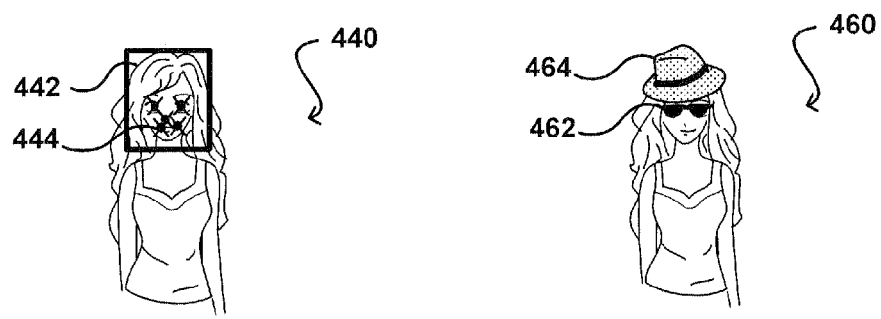

In order to provide more accurate views, a rendering engine can also utilize the shape 402 of the user as determined from the video feed or other such image information. For example, the skeletal information 404 can be used to quickly determine movements and positions, but the image information can provide a more accurate view of the shape of the user's body for the purpose of rendering the clothing to appear as if the user is actually wearing the clothing. As mentioned, this can include stretching, compressing, skewing, or otherwise modifying one or more portions of an item image in order to cause that item image to be shaped according to the specific user and user pose. In the example of FIG. 4(*a*), the information would be used to render a top with one arm extended and pants with the legs spread somewhat apart, in order to match the orientation of the user's body. The information also can be used to adjust a rendering of the clothing items to substantially correspond to the outline of the user's body in order to make the image more realistic and appear as if the user is actually wearing those items.

In addition to determining the orientation and shape of the user, however, a system or service can also analyze data for a clothing item in order to be able to render a view of that item that corresponds to the determined orientation and shape. In the example situation 420 of FIG. 4(*b*), for example, an image of a pair of pants 422 is illustrated that can be used with embodiments discussed herein. In order to facilitate analysis and/or rendering the pants can be displayed in an image with a transparent background or background that can relatively easily be removed from the image. In some embodiments, three-dimensional model information might be available such that the pants can be rendered, texture-mapped, shaded, or otherwise processed to correspond to the determined shape and orientation. Various other processes can be used as well as known in the visual arts for mapping clothing items to the shape of a character.

Using the pair of pants 422 as an example, an image modification process can determine a type of item corresponding to the image, such as whether the image shows a pair of pants, a shirt, a jacket, etc. Based at least in part on the type of item, an image manipulation model can be loaded that can be used to identify portions of the image to be manipulated. For example, a basic pants model might attempt to identify five major portions of a pants image. As illustrated in FIG. 4(*b*), the pants portion can be separated from any background portion, then horizontal dividers can be used to separate a torso portion from the legs, and to divide the legs into upper and lower leg portions. In one example, a first horizontal position 424 is determined that substantially corresponds to the point at which the pant legs come together, or the point at which there is no longer any space between the pant legs. For basic pants (i.e., not capris or other such types) a second horizontal position 426 can be determined that is half way between the first horizontal position 424 and the bottom of the pant legs. This second horizontal position can be used to approximate the knee position in each pant leg. As can be seen in FIG. 4(*b*), such an approach effectively divides the pants into a stationary torso portion and four leg portions, with an upper and lower leg portion for each leg. The portions of the pant image then can be mapped to the corresponding portion of the skeletal information, such as the skeletal information 404 illustrated in FIG. 4(*a*). The portions of the pants image then can be rotated, repositioned, sheared, stretched, or otherwise manipulated to present an orientation 428 that substantially matches a current orientation of the user. As discussed, the actual outline of the user's shape also can be used to stretch the portions of the item to match the user's body shape at the current orientation. Methods for stretching, compressing, rotating, or otherwise distorting an image to fit a model, shape, or pattern are well known in the art and as such will not be discussed herein in detail.

Certain items may not be able to be properly placed and/or rendered using the skeletal and shape information alone, however. For example, sunglasses and hats may need to be positioned with specific orientations and positions that cannot readily be obtained from skeletal information, unless the information includes information such as eye position, chin position, and the like. Similarly, unless the outline of the user's shape includes the outline of specific features within the view of the user's body, additional analysis and/or processing may need to occur to provide for an appropriate rendering of such items.

An approach that can be used in accordance with various embodiments is illustrated in the example state 440 of FIG. 4(*c*). In this example, a head tracking and/or facial feature locating process (executing on the device, remote to the device, accessed through a specific API, etc.) is used to analyze the image and/or video information captured of the user. As known for such purposes, head and/or feature location can be provided by performing feature recognition, pattern matching, contour recognition, or another such process on the captured images of the user. In at least some embodiments, a head tracking algorithm can be used to locate an approximate region 442 of the user's head in the image information. The ability to locate an approximate head region can significantly reduce the amount of image information that must be analyzed for feature recognition. Further, in at least some embodiments the head tracking process can utilize head position information from the skeletal data of the gesture system to determine an approximate head position as well. A feature recognition or facial recognition process can be used to analyze image information within the facial region 442 to determine the approximate location of specific feature points 444 in the captured image information. These feature points can be any appropriate feature points, such as may include eye positions, nose positions, the positions at the edges of a user's mouth and eyebrows, and other such points. These points can be used to enable various types of items to be rendered on the user with an appropriate orientation.

For example, a view 460 of a user can be displayed that has image objects such as a pair of sunglasses 462 and a hat 464 rendered to appear as if the user is wearing the corresponding items. In at least some embodiments, multiple views of a hat, glasses, and other such items can be stored or rendered such that an orientation-dependent view can be provided that matches the orientation of the user's head. The eye positions or other such data can be used to position the items, and the location of the user's eyes or other features with respect to a center point of the user's head in the image can be used to determine a direction in which the user's head is pointing so as to properly render the items. As a user rotates his or her head, the feature positions will update as well such that the rendering of the items can be updated accordingly.

In at least some embodiments the image analysis and facial feature recognition can have an associated delay due at least in part to the necessary processing time. In at least some embodiments, the skeletal information from the gesture system can be used to update the head position in real time, and the facial feature recognition used to update orientation information as quickly as possible. Accordingly, there might be some lag in the updates in orientation due to the processing time if the user quickly turns his or her head, nods, or performs another such action, but the skeletal information can help to decrease the lag for at least large changes in user position. Is should be understood that similar processes can be used for fingers, toes, belly buttons, or other features where the user might want to put jewelry or other such items but those features may not readily be determined from the skeletal and/or shape data from the gesture system in certain embodiments.

As mentioned, data from a gesture system can be shared with multiple computing devices across a network. The ability to share data can enable users to utilize gesture data with devices that are not directly connected to the gesture system. For example, a user can stand in front of a gesture system embedded in a desktop computer or television while viewing data on a tablet computer or smart phone, where the user motions control selections on the tablet computer. A user can also perform gestures to select items to be pushed or otherwise transmitted to other devices. For example, a user selecting an item can cause information for that item to be sent to a wish list for that user that is stored on another device, or can cause information for that item to be sent to another user's device. For example, a user can see something that might be of interest to another user and use the interface to enable information for that item to be sent to a device of that user. Two or more users can also utilize the same gesture system concurrently in at least some systems, which can enable views of any or all of those users to utilize approaches discussed herein.

Figure 5A:
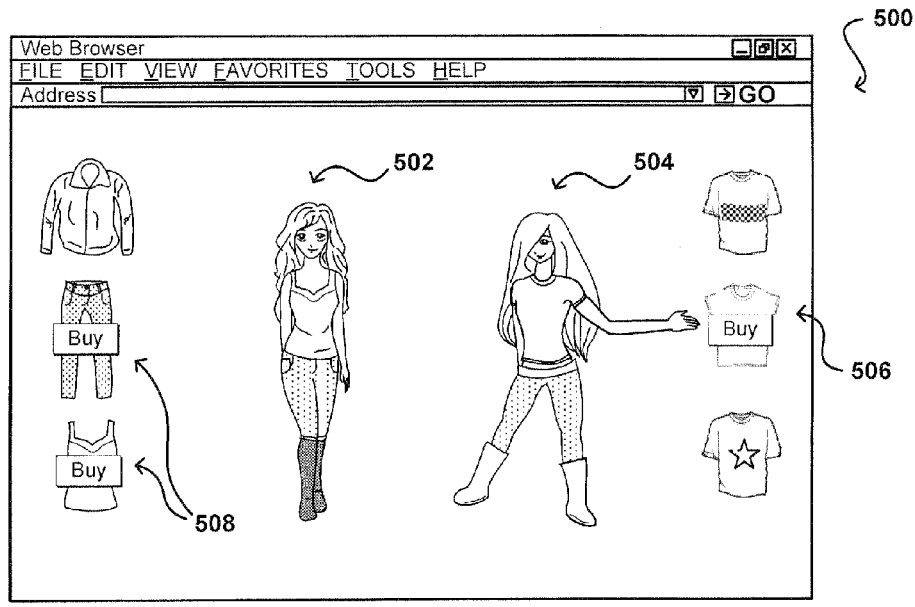
FIGS. 5(a) and 5(b) illustrate example interfaces with which multiple users can interact in accordance with various embodiments.

Similarly, the data from multiple gesture systems can be combined onto a single page or otherwise utilized on one or more computing devices. As an example, the interface state 500 illustrated in FIG. 5(*a*) illustrates views 502, 504 of two different users. The web page might enable both users to engage in a virtual shopping trip, where those users can be in the same location using the same gesture system or in different locations using different gesture systems. The JavaScript (or other active script) for the page can submit requests for data from the appropriate gesture system(s), and one or more widgets can be included in the page to allow that gesture data to be used to control various content displayed on the page. The same, similar, or different versions of the page can be viewed by each of the users, as well as other potential users having access to the gesture data. In this example, each user is able to perform actions or motions to cause items to be displayed on their respective views 502, 504. Two items 508 are shown to have been selected for a first user view 502, and a single item 506 for a second user view. In at least some embodiments, a user can select items to be rendered with respect to that user's view or another user's view. For example, a user might use one arm, hand, or finger to select an item and another arm, hand, or finger to point to the user view for which to render the item. Such an approach can enable users to have joint shopping sessions, where the users can try clothing or other items on their respective views as well as selecting items to have displayed on the other users.

Figure 5B:
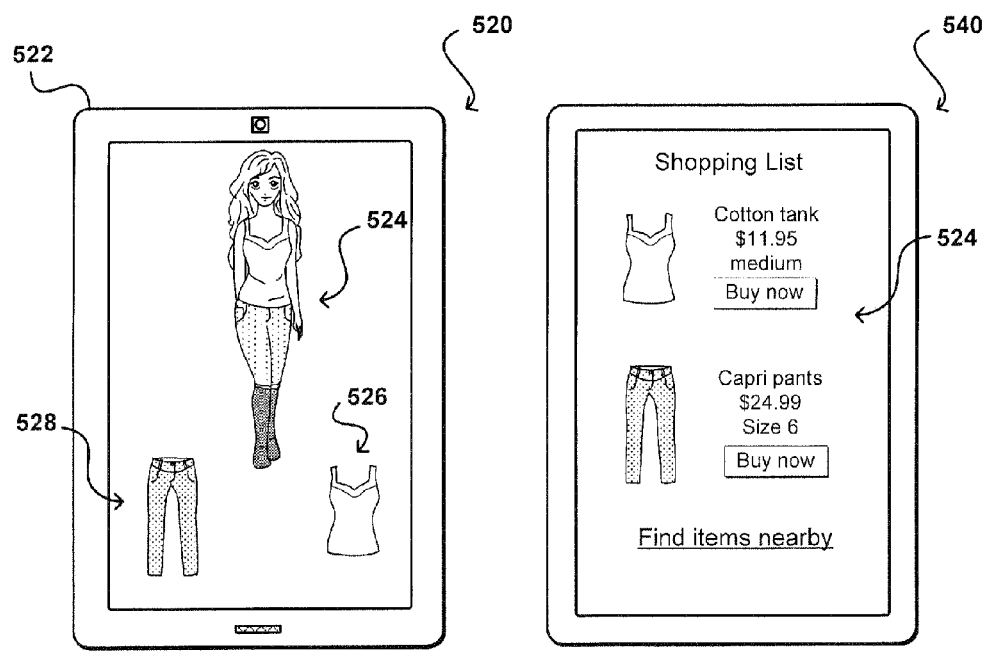

In some embodiments, a user such as a parent might make selections for another user, such as a child. For example, a parent might be in a store or shopping online and see an item of interest. The parent might locate that item through the interface, such as by searching, scanning a barcode, capturing an image of that item, etc. The parent then might request the child, at home or in another location, to stand in front of a gesture system. The parent and/or child then can see what the item would look like on the child, and one or both of them can decide whether to purchase that item for the child, which can be done in the store or from an electronic marketplace, for example. In some embodiments, the child might see a different view of the items on the child's own device. For example, the child might have a computing device 522 as illustrated in FIG. 5(b) that is able to view information about the items of interest, as well as a view of those items on the child. The child can provide feedback, select different items, or perform other actions with respect to the displayed content. Any changes on the child's device can also be replicated to the parent's view as well, such as to change the selection of items or view of the child in FIG. 5(a).

A user also can cause information for items of interest to be pushed to another device for any of a number of different purposes. For example, a user might select a number of items when shopping on a home desktop computer with a gesture system. The user might make a gesture or motion that indicates the information should be stored to a portable computing device, or other designated location. As illustrated in the interface state 540 of FIG. 5(b), information for the items can be stored to a wish list, virtual shopping list, or other such location that the user can take to various stores or physical locations to attempt to view the items in person, try on the items, etc. In some embodiments, an option might be provided to attempt to locate those items nearby, in addition to an option to purchase those items online. Various other approaches can be utilized as well within the scope of the various embodiments.

In some embodiments, each user in a session must manually activate or select an option for the gesture system to include the active view. In other embodiments, a user can activate the view by standing up or performing a "wake" gesture to a gesture system, for example, which can cause the active view and/or gesture control to be activated on the device. Various voice commands or other such controls or inputs can be utilized as well within the scope of the various embodiments. In some embodiments, a user can make a motion or gesture, or simply appear in front of, a gesture system for a different computing device, in order to transfer information, content, and or control to the other computing devices. Various motions such as bumps, throws, or swipes can be used to pass information or control between different devices as well. Further, different finger positions, hand positions, or other variations can be used to adjust the meaning of a gesture or motion. For example, a user might point in a direction with one finger to indicate an item, but with two fingers to cause that item to appear on a view of the user, purchase that item, or perform another such action. Similarly, a user might make a specific hand gesture to "grab" and item and move it to another location, then stop making that motion to "drop" the item. A user also can swipe over a range of items, such as search results, images, or articles, while making a selection gesture to select a group of items. A user can hold up two fingers to select an item in the second column, and three fingers to select an item in the third column along a direction of the finger(s). The gestures also can be used to select items in three dimensions, with at least a portion of the gesture or motion being toward, or away from, the gesture system. Various other gestures, motions, and actions can be used as well, as should be apparent to one of ordinary skill in the art in light of the teachings and suggestions contained herein.

Figure 6:
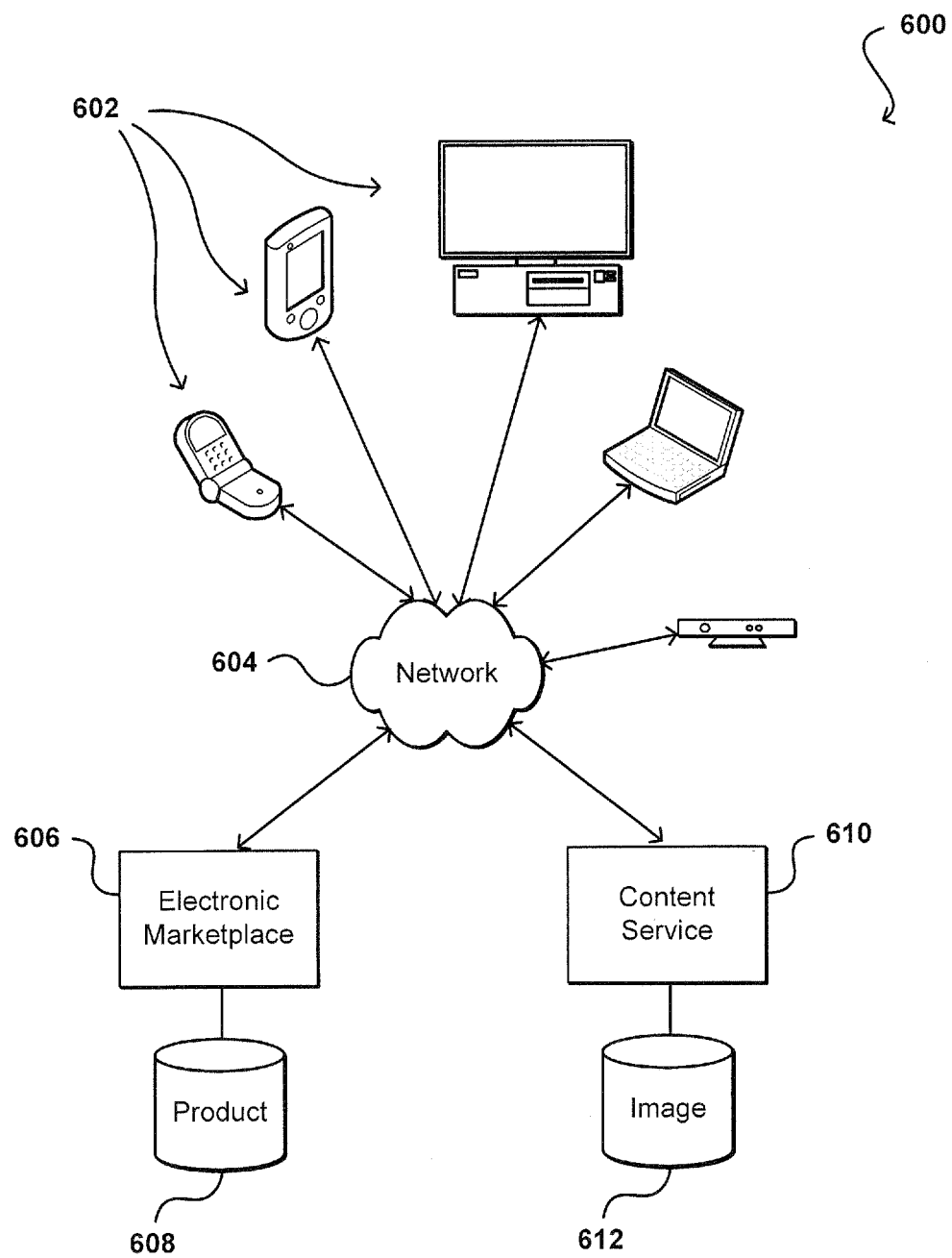
FIG. 6 illustrates an example environment in which various embodiments can be implemented.

FIG. 6 illustrates an example environment 600 in which aspects of various embodiments can be implemented. As discussed, the gesture data can be used with any of a number of different client devices 602 of any appropriate type. These devices can belong to the same or different users, and some, none, or all of these devices might include components capable of being utilized as a gesture system. Other devices might include, or require, outside or peripheral components to be utilized as a gesture system in various embodiments. In this example, the devices are connected across at least one network 604 to a content provider system, such as an electronic marketplace 606 offering products for consumption, where information for those products is stored in at least one product data store 608. A user can utilize one of the client devices 602 to view a page of content accessed from the electronic marketplace 606 over the at least one network, where gesture data captured by a gesture system of the same or a different client device can be embedded in and/or utilized with the page of content. In embodiments where images of items such as clothing are to be manipulated and rendered with a view of the user, for example, the storing, modifying, and/or other processing of the images can be performed by a content service 610 or other such entity, where the content service can be associated with the electronic marketplace 606 or a third party provider. The images to be manipulated can be accessed from the product data store 608 of the electronic marketplace and/or an image data store 612 of the content service. In many embodiments the script enabling content to be manipulated by users via gesture systems can be executed on the client devices and/or the electronic marketplace system, while in other embodiments dedicated servers or other such components, services, or providers can manage the flow of gesture data and content between the various devices and locations.

Figure 7:
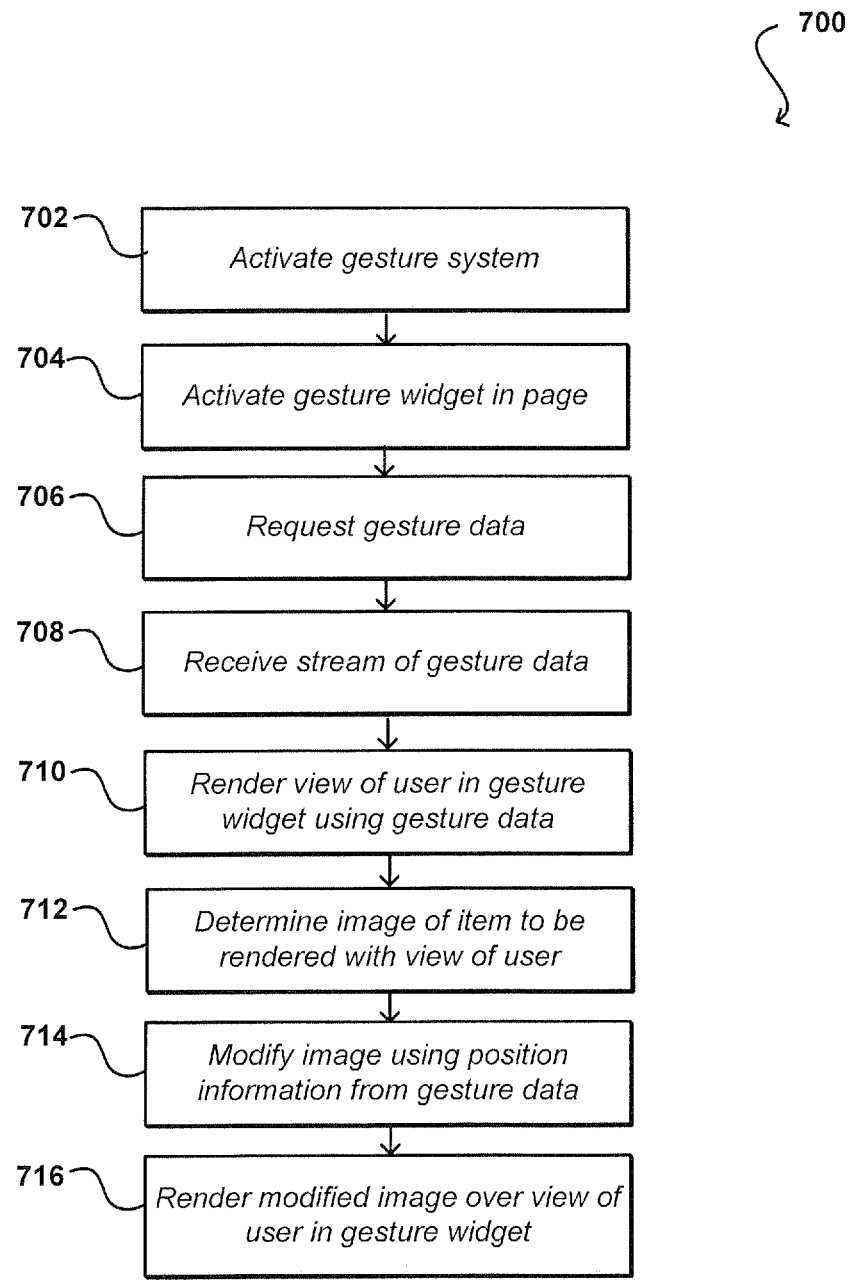
FIG. 7 illustrates an example process for enabling image content to be rendered with respect to a view of a user in accordance with various embodiments.

FIG. 7 illustrates an example process 700 for enabling items to be rendered on a view of a user of a gesture system in accordance with various embodiments. It should be understood that, for any process discussed herein, there can be additional, fewer, or alternative steps performed in similar or alternative orders, or in parallel, within the scope of the various embodiments unless otherwise stated. In this example, a gesture system is activated 702 that is able to capture image, position, and/or motion data of a user. The system can be activated manually by a user, through a request or instruction from an application, or automatically in response to a user standing up or moving in front of the gesture system, among other such options. A gesture widget also can be loaded, executed, rendered, embedded or otherwise activated 704 in a page of content, or other interface portion, accessed by a user. In at least some embodiments the page is a Web page associated with JavaScript or another active script executing in a browser application and operable to utilize gesture data with the page of content. Gesture data can be requested 706 from the browser application and a stream of gesture data received 708 from the activated gesture system. As discussed, the gesture data can include various types of data, including image data captured of a user and position data determined using structured light detection or another such process. Using the received gesture data, a view of the user can be rendered 710 in the gesture widget that represents a current orientation of the user, with some delay due to the capture, transmission, processing, and rendering steps. Through script executing in the browser, at least one image to be rendered with the view of the user is determined 712. The image can correspond to a clothing item or other object selected by the user or otherwise indicated. Using position information from the gesture data indicating a current orientation or state of the user, the determined image can be modified 714 to correspond to the displayed orientation of the user. As discussed, the image can be stretched, compressed, skewed, or otherwise manipulated in order to correspond to the orientation and/or appearance of the user. The modified image then can be rendered 716 over the view of the user, in the proper location in the gesture widget, such that it appears as if the user is holding, wearing, or otherwise utilizing or interacting with the object in the image. Such an approach enables an image of an item from outside the gesture system environment to be modified and added to the environment in a way that makes it appear as if the item is actually with or on the user in the captured image information.

Figure 8:
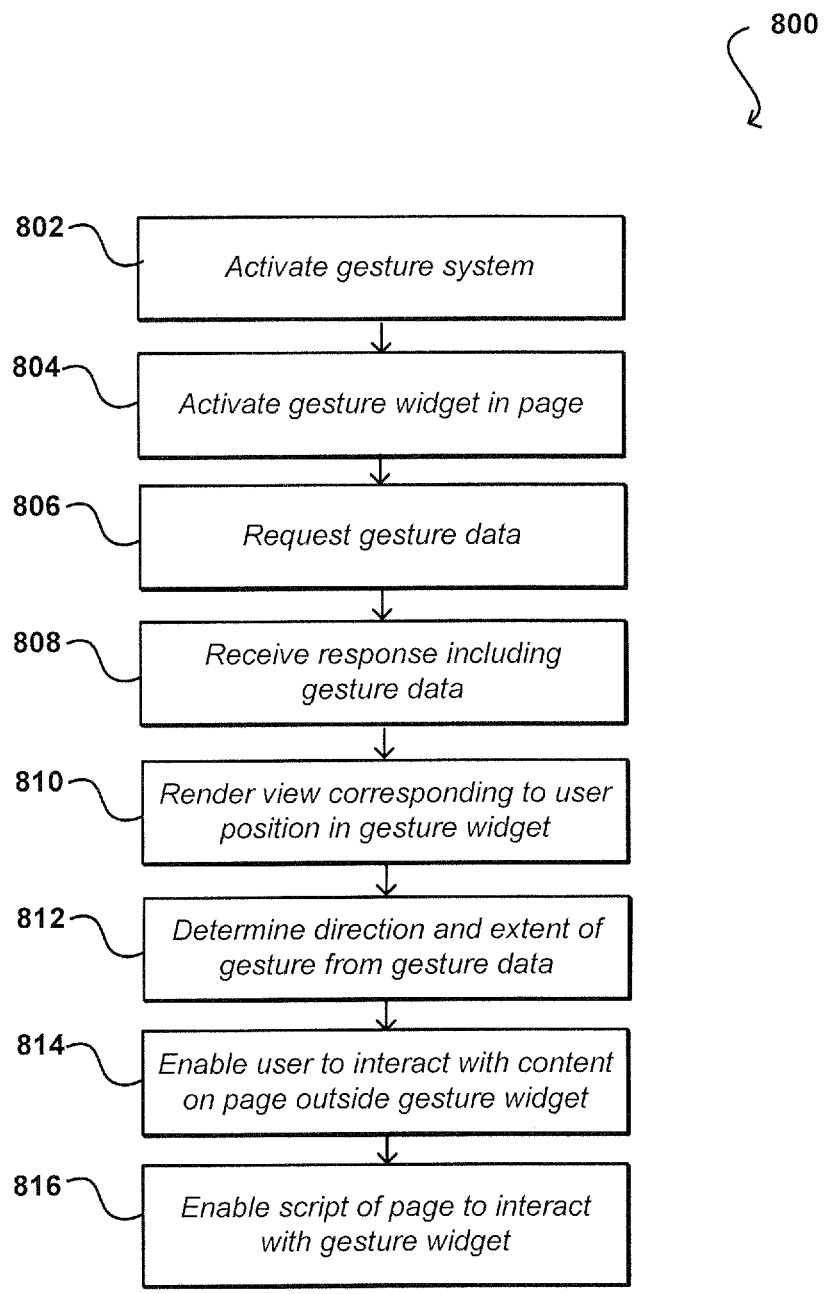
FIG. 8 illustrates an example process for enabling a user to control aspects of an interface through gesture input that can be used in accordance with various embodiments.

FIG. 8 illustrates a similar process 800 that can enable the user to perform actions such as to select the image to be rendered with the user view in accordance with various embodiments. As mentioned above, the gesture system and gesture widget can be activated 802, 804, with gesture data being requested 806 by a browser or other appropriate application. In this example, a response is received 808 that includes the gesture data, which as discussed previously can effectively open a flow of gesture data to the browser. Iframes or other such constructs can be used where cross-domain communication is needed to utilize the gesture data with the page content. A view corresponding to the user position and/or orientation can be rendered 810 in the gesture widget. While in some embodiments the view will correspond to video captured by the gesture system, in other embodiments the view can provide an avatar, directional indicator, or other such graphical element that enables the user to determine at least some aspect of the input being provided by the gesture system. Using the gesture data, the direction and/or extent of a gesture being performed by the user can be determined 812. As discussed, this can involve determining the angle of a user's arm or finger, as well as how far the arm or linger is extended, among other such information. Using the direction and/or extent information, the user can be enabled 814 to interact with content on the page that is outside the gesture widget. As mentioned, this can involve selecting items to purchase, search results to view, options to activate, or other such functionality. In at least some embodiments, the script of the page is also enabled 816 to interact with one or more aspects of the gesture widget, such as to change an appearance of the user view, add an additional view, select one of multiple users having gesture information collected, and the like. Various other options can be utilized as well within the scope of the various embodiments.

Certain embodiments can display a grid over a page instead of providing a view of the user, where a highlighted grid portion can correspond to the current input location of the user from the gesture system. The grid could come up automatically when a user stands in front of the gesture system, is detected to make a motion or gesture, claps his or her hands, or speaks a voice command, among other such options. In other embodiments, a user can move the gesture widget among the cells so as to have a smaller input area. For example, there might be a hundred items on a page that the user can select. In order to avoid the user having to make very large and/or precise motions or gestures, the user can have the ability to select from among ten cells each containing ten items, in order to enable more simple gestures to select the item of interest. A user might be able to perform a swipe motion or other such gesture to move between cells.

Since gesture data can include image information including a view of the user, a system can attempt to determine aspects of the user that can assist with various aspects of, for example, a user selection process. If a facial recognition process can identify the user, search results can be displayed that are based upon preferences or stored information for that user. If an image analysis process can identify a gender or approximate age or size of a user, that information can be used to narrow search results or other information selected to be displayed to the user. If views of a male user and a female user are shown on a page, and an item for a female is selected, the system can assume that the item should be rendered for the female in at least some situations. Various other aspects can be determined and used to adjust a selection of content as well within the scope of the various embodiments.

In some embodiments, a computing device might utilize one or more motion-determining elements, such as an electronic gyroscope, to attempt to assist with motion and gesture determinations. By determining movements of the device during image capture, effects of the device movement can be removed to provide more accurate three-dimensional position information for the tracked user features. Further, determining that an apparent motion in the image information was due to a device movement instead of a user gesture can help to prevent false input determinations.

Figure 9:
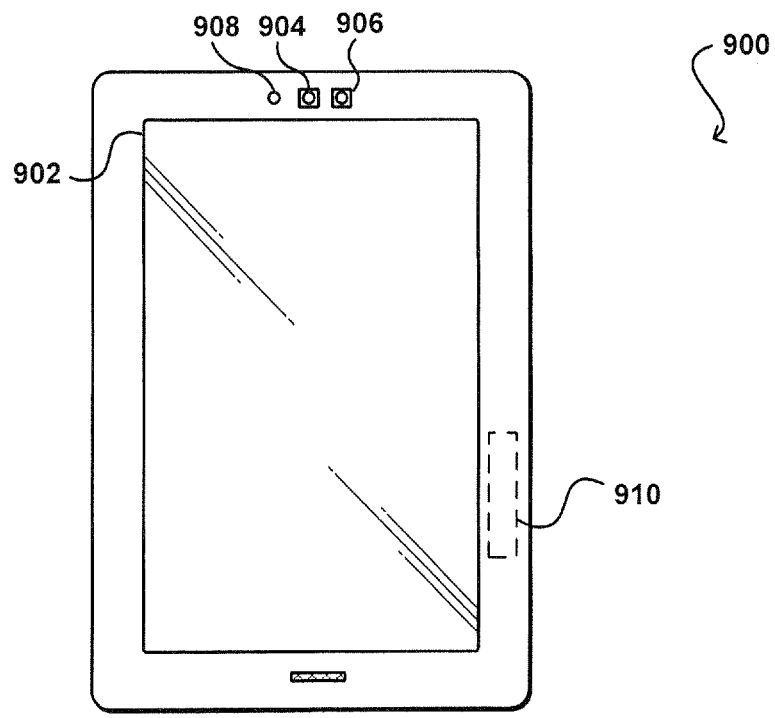
FIG. 9 illustrates an example computing device that can be used in accordance with various embodiments.

FIG. 9 illustrates an example computing device 900 that can be used to perform methods in accordance with various embodiments discussed and suggested herein. In this example, the device has at least one camera or sensor 904, 906 positioned at various locations on the same side of the device as a display element 902, enabling the device to capture image and/or position information about a user of the device during typical operation where the user is at least partially in front of the display element. In this example, the camera and/or sensor are each capable of capturing image information over a visible and/or infrared (IR) spectrum, and in at least some embodiments can select between visible and IR operational modes. It should be understood, however, that there can be fewer or additional elements of similar or alternative types in other embodiments, and that there can be combinations of cameras, infrared detectors, gesture sensors, and other such elements used with various devices.

In this example, a light sensor 908 is included that can be used to determine an amount of light in a general direction of objects to be captured. In some embodiments, at least one illumination element, such as a white light emitting diode (LED) or infrared (IR) emitter, as discussed elsewhere herein, can be utilized for providing illumination in a particular range of directions when, for example, there is insufficient ambient light determined by the light sensor or reflected IR radiation is to be captured, such as where a pattern of structured light is to be produced as part of a gesture system. A motion determining element 910 can also be utilized to attempt to distinguish user movement from device movement. Various other elements and combinations of elements can be used as well within the scope of the various embodiments as should be apparent in light of the teachings and suggestions contained herein.

Figure 10:
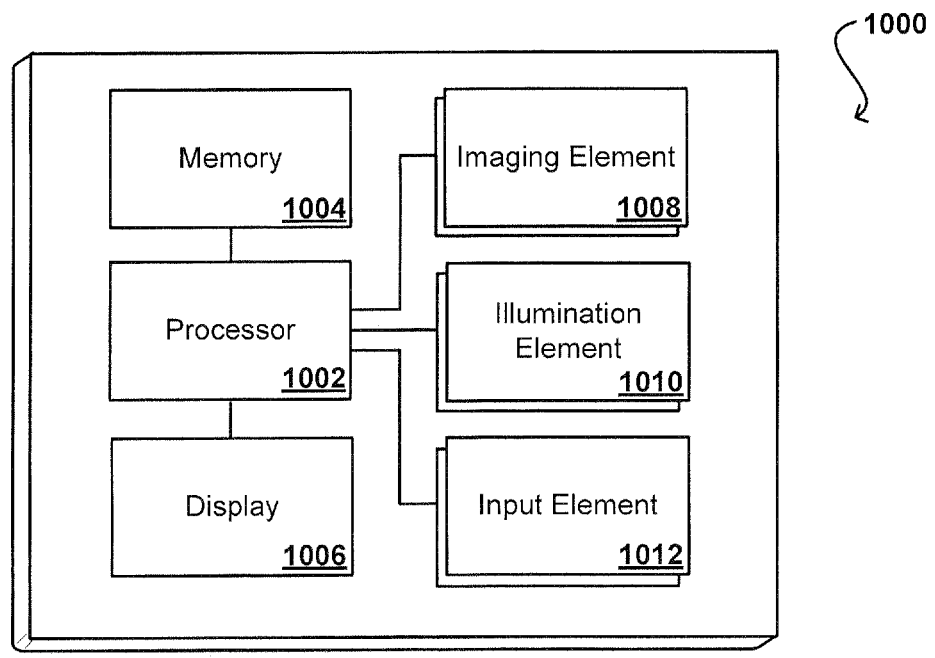
FIG. 10 illustrates an example configuration of components of a computing device such as that illustrated in FIG. 9.

In order to provide various functionality described herein, FIG. 10 illustrates an example set of basic components of a computing device 1000, such as the device 900 described with respect to FIG. 9. In this example, the device includes at least one central processor 1002 for executing instructions that can be stored in at least one memory device or element 1004. As would be apparent to one of ordinary skill in the art, the device can include many types of memory, data storage or non-transitory computer-readable storage media, such as a first data storage for program instructions for execution by the processor 1002, the same or separate storage can be used for images or data, a removable storage memory can be available for sharing information with other devices, etc. The device typically will include some type of display element 1006, such as a touch screen, electronic ink (e-ink), organic light emitting diode (OLED) or liquid crystal display (LCD), although devices such as portable media players might convey information via other means, such as through audio speakers. In at least some embodiments, the display screen provides for touch or swipe-based input using, for example, capacitive or resistive touch technology.

As discussed, the device in many embodiments will include at least one image capture element 1008, such as one or more cameras or sensors that are able to image a user, people, or objects in the vicinity of the device. An image capture element can include, or be based at least in part upon any appropriate technology, such as a CCD or CMOS image capture element having a determined resolution, focal range, viewable area, and capture rate. The image capture elements can also include at least one IR sensor or detector operable to capture image information for use in determining gestures or motions of the user. In some embodiments, the cameras and/or sensors used for motion and gesture recognition might be provided through a separate peripheral device, such as a sensor bar. The example device includes at least one illumination component 1010, such as an IR source with a patterned lens for producing structured light. The device also can include at least one other illumination element, as may include one or more light sources (e.g., white light LEDs, IR emitters, or flashlamps) for providing illumination for a standard digital video camera.

The example device can include at least one additional input element 1012 configured to receive conventional input from a user. This conventional input can include, for example, a push button, touch pad, touch screen, wheel, joystick, keypad, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual (e.g., gesture) and audio (e.g., spoken) commands such that a user can control the device without having to be in contact with the device.

As discussed, different approaches can be implemented in various environments in accordance with the described embodiments. As will be appreciated, although a Web-based environment is used in various examples for purposes of explanation, different environments may be used, as appropriate, to implement various embodiments. An example electronic client device can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. The network can include the Internet, a cellular network, a local area network (LAN) and the like. Various network-specific components can be used, although not shown, as would be apparent to one of ordinary skill in the art.

It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. An application server can include any appropriate hardware and software for integrating with the data store as needed to execute aspects of one or more applications for the client device and handling a majority of the data access and business logic for an application. The application server can provide access control services in cooperation with the data store and is able to generate content such as text, graphics, audio and/or video to be transferred to the user, which may be served to the user by a Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

The data store can include several separate data tables, databases or other data storage mechanisms and media for storing data relating to a particular aspect. For example, the data store can include mechanisms for storing content (e.g., production data) and user information, which can be used to serve content for the production side. The data store can also include a mechanism for storing log or session data. It should be understood that there can be many other aspects that may need to be stored in the data store, such as page image information and access rights information, which can be stored in any of the above listed mechanisms as appropriate or in additional mechanisms in the data store. The data store is operable, through logic associated therewith, to receive instructions from the application server and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are described. Thus, the depiction of the system should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, JavaScript, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one, or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keypad, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and non-transitory computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method of rendering content, comprising:
    initiating a session with an electronic marketplace, the electronic marketplace offering a plurality of items for consumption;
    enabling a first user and a second user to join the session, the first user joining via a first computing device that includes a first browser application and the second user joining via a second computing device that includes a second browser application;

receiving a first set of position data and a first set of image data from a first gesture system associated with the first user of the first computing device, the first set of image data including a view of a current orientation of the first user and the first set of position data corresponding to features of the first user at the current orientation;

receiving a second set of position data and a second set of image data from a second gesture system associated with the second user of the second computing device, the second set of image data including a view of a current orientation of the second user and the second set of position data corresponding to features of the second user at the current orientation;

displaying a first Web page for the session using the first browser application executing on the first computing device, the first Web page including a first view of the first user using the first set of image data and a second view of the second user using the second set of image data, the first view being contained in a first gesture module on the first Web page and the second view being contained in a second gesture module on the first Web page, the first view including a representation of the current orientation of the first user and the second view including a representation of the current orientation of the second user, the first Web page including a first set of a plurality of user-selectable objects positioned outside of the first gesture module and the second gesture module, one of the plurality of user-selectable objects of the first set corresponding to a wearable item;

analyzing the first set of position data to determine a first user motion configured to cause the wearable item to be displayed on a second Web page, the second Web page including the first view of the first user using the first set of image data and the second view of the second user using the second set of image data, the first view being contained in a third gesture module on the second Web page and the second view being contained in a fourth gesture module on the second Web page;

analyzing the second set image data to determine a three-dimensional model that approximates a shape of the second user; and displaying, on the second gesture module and the fourth gesture module of the second Web page, the representation of the wearable item to appear to be worn by the second user based at least in part on the current orientation of the second user, the second Web page including a second set of a plurality of user-selectable objects, the second set of the plurality of user-selectable objects being displayed outside the third gesture module and the fourth gesture module, at least one user-selectable object of the second set of the plurality of user-selectable objects being different from each user-selectable object of the first set of the user-selectable objects.

2. The computer-implemented method of claim 1, wherein the each of the first and second users are able to modify a state of at least one of the first and second Web pages using a respective motion or gesture.

3. The computer-implemented method of claim 1, wherein the first view and the second view is updated with changes in the current orientation of one of the first user or second user on both the first and second Web pages.

4. The computer-implemented method of claim 1, wherein additional users are able to join in the session including the first and second users.

5. The computer-implemented method of claim 1, further comprising:

rendering, concurrently, a representation of the current orientation of the first user and a representation of the current orientation of the second user on at least one of the first Web page or the second Web page.

6. The computer-implemented method of claim 1, further comprising:

animating a display of a transfer of the wearable item from the first Web page to the second Web page in response to the first user motion.

7. A computer-implemented method, comprising:

under control of one or more computer systems configured with executable instructions, initiating a session with an electronic marketplace, the electronic marketplace offering a plurality of items for consumption;

enabling a first user and a second user to join the session, the first user joining via a first computing device that includes a first browser application and the second user joining via a second computing device that includes a second browser application;

receiving first position data and first image data associated with the first user of the first computing device from a first gesture system, the first position data associated with the first user corresponding to a current orientation of the first user with respect to the first gesture system and the first image data associated with the first user including a first view of the current orientation of the first user;

receiving second position data and second image associated with the second user of the second computing device from a second gesture system, the second position data associated with the second user corresponding to a current orientation of the second user with respect to the second gesture system and the second image data associated with the second user including a second view of the current orientation of the second user;

displaying a first Web page for the session using the first browser application, the first Web page including the first view of the current orientation of the first user in a first gesture module, a second view of the current orientation of the second user in a second gesture module, and a first set of a plurality of user-selectable objects positioned outside of the first gesture module and the second gesture module, one of the plurality user-selectable objects corresponding to a wearable item;

analyzing the first position data to determine a first user motion configured to cause a wearable item to be displayed on a second Web page, the second Web page including the first view of the first user and the second view of the second user, the first view being contained in a third gesture module on the second Web page and the second view being contained in a fourth gesture module on the second Web page;

analyzing the second image data associated with the second user to determine a three-dimensional model that approximates a shape of the second user; and displaying, on the second gesture module and the fourth gesture module of the second Web page, the representation of the wearable item to appear to be worn by the second user based at least in part on the current orientation of the second user, the second Web page including a second set of a plurality of user-selectable objects, a portion of the second set of the plurality of user-selectable objects corresponding to the first set of the user-selectable objects, the second Web page including a second set of a plurality of user-selectable objects, the second set of the plurality of user-selectable objects being displayed outside the third gesture module and the fourth gesture module, at least one user-selectable object of the second set of the plurality of user-selectable objects being different from each user-selectable object of the first set of the user-selectable objects.

8. The computer-implemented method of claim 7, further comprising:
detecting movement of one of the first user or the second user; and
updating one of the first view or the second view.

9. The computer-implemented method of claim 7, wherein one of the first gesture system or the second gesture system is separate from a provider of the electronic market place.

10. The computer-implemented method of claim 7, wherein the first gesture system and the second gesture system are configured to communicate with each other.

11. The computer-implemented method of claim 10, wherein the first gesture system and the second gesture system are configured to pass user-selectable object between them.

12. The computer-implemented method of claim 7, wherein at least one of first gesture system or the second gesture system includes at least one video camera capable of providing video image data and at least one structured light subsystem operable to provide position data.

13. The computer-implemented method of claim 7, further comprising:
detecting an action by one of the first user or the second user, wherein causing an action to be performed includes adding at least one item to at least one of a shopping list or a wish list for at least one of the first or second users.

14. The computer-implemented method of claim 7, wherein the first position data associated with the first user is received as at least one stream of JSON data, and JavaScript executing in a browser application is configured to accept and analyze the stream of JSON data to determine at least one of a motion or gesture of the first user.

15. A computing device, comprising:
a device processor;
a display screen; and
a memory device including instructions operable to be executed by the device processor to perform a set of actions, enabling the computing device to:
initiate a session with an electronic marketplace, the electronic marketplace offering a plurality of items for consumption;
enable a first user and a second user to join the session, the first user joining via a first computing device that includes a first browser application and the second user joining via a second computing device that includes a second browser application;
receive first position data and first image data associated with the first user of the first computing device from a first gesture system, the first position data associated with the first user corresponding to a current orientation of the first user with respect to the first gesture system and the first image data associated with the first user including a first view of the current orientation of the first user;
receive second position data and second image data associated with the second user of a second computing device from a second gesture system, the second position data corresponding to a current orientation of the second user with respect to the second gesture system and the second image data associated with the second user including a second view of the current orientation of the second user;
display a first Web page for the session using the first browser application, the first Web page including the first view of the current orientation of the first user in a first gesture module, a second view of the current orientation of the second user in a second gesture module, and a first set of a plurality of user-selectable objects positioned outside of the first gesture module and the second gesture module, one of the plurality user-selectable objects corresponding to a wearable item;
analyze the first position data to determine a first user motion configured to cause a wearable item to be displayed on a second Web page, the second Web page including the first view of the first user and the second view of the second user, the first view being contained in a third gesture module on the second Web page and the second view being contained in a fourth gesture module on the second Web page;
analyze the second image data associated with the second user to determine a three-dimensional model that approximates a shape of the second user; and
display, on the second gesture module and the fourth gesture module of the second Web page, the representation of the wearable item to appear to be worn by the second user based at least in part on the current orientation of the second user, the second Web page including a second set of a plurality of user-selectable objects, a portion of the second set of the plurality of user-selectable objects corresponding to the first set of the user-selectable objects, the second Web page including a second set of a plurality of user-selectable objects, the second set of the plurality of user-selectable objects being displayed outside the third gesture module and the fourth gesture module, at least one user-selectable object of the second set of the plurality of user-selectable objects being different from each user-selectable object of the first set of the user-selectable objects.

16. The computing device of claim 15, wherein the each of the first and second users is able to modify a state of one of the first view or the second view using a respective motion or gesture.

17. The computing device of claim 15, wherein the first view of the first user and the second view of the second user is updated with changes in the current orientation of one of the first user or the second user.

18. The computing device of claim 15, wherein additional users are able to join in the session including the first and second users.

19. The computing device of claim 15, the instructions further configured to cause the computing device to:
detect movement of one of the first user or the second user; and
update one of the first view or the second view of at least one of the first user or the second user.

20. The computing device of claim 15, wherein at least one of the first or second gesture systems includes at least one video camera capable of providing video image data and at least one structured light subsystem operable to provide the position data.

21. A non-transitory computer-readable storage medium storing instructions that, when executed by at least one processor of a computing device, cause the computing device to:

initiating a session with an electronic marketplace, the electronic marketplace offering a plurality of items for consumption;

enabling a first user and a second user to join the session, the first user joining via a first computing device that includes a first browser application and the second user joining via a second computing device that includes a second browser application;

receive first position data and first image data associated with the first user of the first computing device from a first gesture system, the first position data associated with the first user corresponding to a current orientation of the first user with respect to the first gesture system and the first image data associated with the first user including a first view of the current orientation of the first user;

receive second position data and second image associated with the second user of the second computing device from a second gesture system, the second position data associated with the second user corresponding to a current orientation of the second user with respect to the second gesture system and the second image data associated with the second user including a second view of the current orientation of the second user;

display a first Web page for the session using the first browser application, the first Web page including the first view of the current orientation of the first user in a first gesture module, a second view of the current orientation of the second user in a second gesture module, and a first set of a plurality of user-selectable objects positioned outside of the first gesture module and the second gesture module, one of the plurality user-selectable objects corresponding to a wearable item;

analyze the first position data to determine a first user motion configured to cause a wearable item to be displayed on a second Web page, the second Web page including the first view of the first user and the second view of the second user, the first view being contained in a third gesture module on the second Web page and the second view being contained in a fourth gesture module on the second Web page;

analyze the second image data associated with the second user to determine a three-dimensional model that approximates a shape of the second user; and display, on the second gesture module and the fourth gesture module of the second Web page, the representation of the wearable item to appear to be worn by the second user based at least in part on the current orientation of the second user, the second Web page including a second set of a plurality of user-selectable objects, a portion of the second set of the plurality of user-selectable objects corresponding to the first set of the user-selectable objects, the second Web page including a second set of a plurality of user-selectable objects, the second set of the plurality of user-selectable objects being displayed outside the third gesture module and the fourth gesture module, at least one user-selectable object of the second set of the plurality of user-selectable objects being different from each user-selectable object of the first set of the user-selectable objects.

22. The non-transitory computer-readable storage medium of claim 21, wherein the each of the first and second users is able to modify a state of one of the first view or the second view using a respective motion or gesture, and wherein the first view of the first user and the second view of the second user is updated with changes in the current orientation of one of the first user or the second user.

23. The non-transitory computer-readable storage medium of claim 21, the instructions further configured to cause the computing device to:

detect movement of one of the first user or the second user; and update one of the first view or the second view of at least one of the first user or the second user.

24. The non-transitory computer-readable storage medium of claim 21, wherein at least one of the first or second gesture systems includes at least one video camera capable of providing video image data and at least one structured light subsystem operable to provide the position data.

* * * * *